United States Patent [19]

Robusto et al.

[11] Patent Number: 4,893,900
[45] Date of Patent: Jan. 16, 1990

[54] METHOD OF ALTERING REFLECTIVITY OF OPTICAL ELEMENTS

[75] Inventors: Paul F. Robusto, Carlsbad; David D. Scofield, San Diego; Chan H. Wang, Poway; John C. Hamacher, Vista, all of Calif.

[73] Assignee: Hughes Aircraft Company, Los Angeles, Calif.

[21] Appl. No.: 246,709

[22] Filed: Sep. 20, 1988

[51] Int. Cl.[4] .............................................. G02B 27/00
[52] U.S. Cl. .................................. 350/320; 350/96.15
[58] Field of Search .................. 350/320, 1.1, 1.6, 1.7, 350/96.15, 96.16, 631; 250/458.1, 459.1

[56] References Cited

U.S. PATENT DOCUMENTS 4,669,817  6/1987  Mori ................................. 350/96.15

OTHER PUBLICATIONS

Matizen, Yu E. and Troitskii, Yu V., "Formation of Non-Gaussian Light Beams in a Laser With an Exit Mirror Characterized by a Smooth Amplitude Inhomogeneity"; Sov. J. Quantum Electron, 16, Jul. 1986; pp. 941–944.

*Primary Examiner*—Bruce Y. Arnold
*Assistant Examiner*—Loha Ben
*Attorney, Agent, or Firm*—Joseph E. Szabo; Wanda K. Denson-Low

[57] ABSTRACT

A method for restricting the mode of operation of long wavelength waveguide laser (FIG. 1) by introducing an approximate step function into the reflectivity of circular optical elements (19) used in such lasers. The preferred method is to grind off a portion of the optical coating (20) of the optical element (19) leaving a circular unground region (26) of high reflectivity having a diameter (D) of approximately 60% of the laser bore width (b) bounded by a ground region (28) of lower reflectivity. The method permits simple, inexpensive field modification of existing lasers.

19 Claims, 1 Drawing Sheet

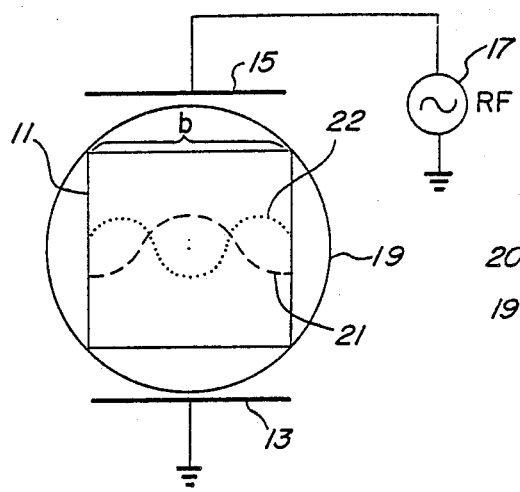
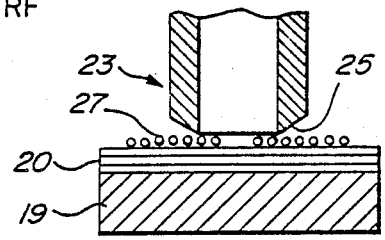
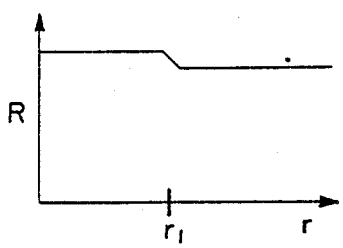
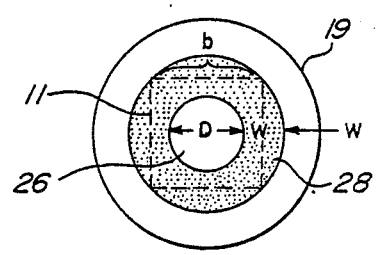
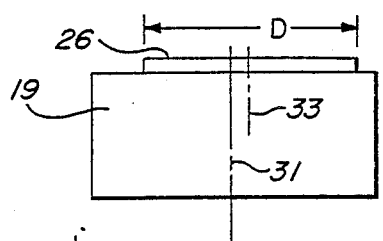
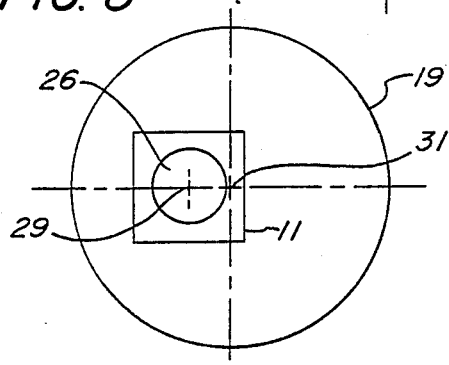
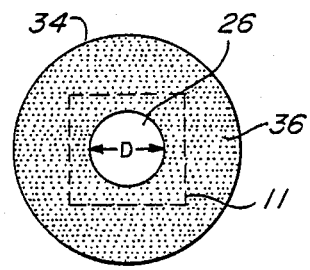
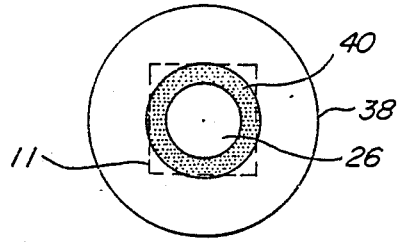

METHOD OF ALTERING REFLECTIVITY OF OPTICAL ELEMENTS

BACKGROUND OF THE INVENTION

1. Field of the Invention

The subject invention relates to lasers and more particularly, to a method for providing optical elements of effectively tapered reflectivity useful in restricting the mode of operation of relatively long wavelength waveguide lasers.

2. Description of Related Art

In certain applications, such as material processing, laser radar, phased arrays and missile guidance, it is desirable to have a laser whose output is restricted to a particular mode, for example, the $EH_{11}$ mode. Where a laser is turned on and operated for a short period, its performance may be dominated by warm-up or thermal equilibration effects. During warm-up, for example, the length of the laser cavity changes, and the laser output oscillates through a series of modes.

In the prior art, mode control is typically obtained by careful alignment of the cavity optics. The lasers do not usually have adequate mode control to ensure operation in the preferred $EH_{11}$ mode over the full operating range. Additional $EH_{11}$ mode control may be achieved by decreasing the waveguide bore size and/or increasing the dielectric losses at the waveguide walls to increase waveguide losses for higher modes. Reducing the waveguide bore size is generally successful in controlling mode but results in a substantial reduction in laser output power and efficiency. Increasing the dielectric losses (e.g. by roughing the waveguide walls) is not reproducible and usually does not provide adequate mode control.

As disclosed in the article "Formation of non-Gaussian light beams in a laser with an exit mirror characterized by a smooth amplitude inhomogeneity," Soviet Journal of Quantum Electronics, July 1986, mirrors with a smooth variation in reflectivity have been used on non-waveguide lasers to achieve mode control or to force operation on a higher order Gaussian mode. To date, there is no reported application of this approach to waveguide lasers. Fabrication of such mirrors, which is achieved by an evaporation process, is expensive. Such a procedure must be carried out in a manufacturing or laboratory environment, typically using a vacuum deposition system to treat a large number of optic elements. It is thus not suitable for quick, inexpensive field modification of existing lasers. It is also not easily adaptable to applications where the optic (mirror) is not aligned with the center of the bore hole of the laser.

SUMMARY OF THE INVENTION

It is therefore an object of the invention to improve lasers;

It is another object of the invention to provide a simple method for restricting the mode of operation of waveguide lasers;

It is another object of the invention to provide a method of altering optical elements of waveguide lasers at field sites in a way which restricts the mode of operation of the laser;

It is a particular object of the invention to provide a method for confining the mode of operation of a $CO_2$ waveguide laser to the $EH_{11}$ mode.

The subject invention relates to a method of achieving mode control particularly applicable to long wavelength waveguide lasers, for example, such as carbon dioxide ($CO_2$) lasers. The method comprises altering the optical reflectivity of a circular optic reflective element in a manner which imparts a step function approximation to the desired tapered reflectivity characteristic of the element. The preferred method of achieving this characteristic is by grinding off a portion of the optical coating of the optical element. The grinding operation removes coating material, decreasing the reflectivity, while leaving scratches in the optic element of a size such that individual scratches do not affect the laser's performance. The individual scratches are effectively not seen by the long wavelength of the laser (e.g. $CO_2$).

The technique according to the invention permits quick repair of lasers at field locations. It has been found highly effective in restricting operation of $CO_2$ lasers to the $EH_{11}$ mode.

BRIEF DESCRIPTION OF THE DRAWINGS

The preferred embodiment of the just summarized invention will now be described in detail in conjunction with the drawings of which:

FIG. 1 is a schematic diagram of a waveguide laser;

FIG. 2 is a cross-sectional schematic illustrating the method of the preferred embodiment;

FIG. 3 is a top schematic view of an altered optic element;

FIG. 4 is a top schematic view of an altered optic element;

FIG. 5 is a top schematic view of an altered optic element;

FIG. 6 is a graph of reflectivity vs. radius;

FIG. 7 illustrates an offset central reflective area according to the preferred embodiment; and FIG. 8 shows an optic element aligned off-center to a laser bore hole.

DESCRIPTION OF THE PREFERRED EMBODIMENTS

FIG. 1 schematically illustrates a $CO_2$ waveguide laser. The laser includes a waveguide 11, first and second electrodes 13, 15, an RF power source 17 connected to the second electrode 15, and a reflective optical element or mirror 19. As is well known, activation of the RF power source 17 activates laser operation through excitation of gas molecules and the subsequent build up of their emitted energy within the laser cavity between the reflective elements, e.g. 19, at each end of the cavity.

FIG. 1 further illustrates a $EH_{11}$ mode of oscillation, indicated by a dashed line 21 and a $EH_{12}$ mode of oscillation indicated by a dotted line 22. According to the preferred embodiment, the optical element 19 is specially ground to substantially eliminate the $EH_{12}$ mode of operation.

FIG. 2 is illustrative of the preferred grinding operation on a typical multilayer optical element 19 having an optical coating 20. As shown, a grinding tool 23 is employed having an annular grinding surface 25. The grinding tool 23 is rotated in a circular motion and applied downwardly against grit powder 27 disposed between the tool 23 and the optical coating 20. The grinding operation is performed until one or more layers of the optical coating 20 is removed sufficient to establish a step approximation of the desired reflectivity profile as discussed in connection with FIG. 6. This depth can vary with the reflectivity of various coatings but is typically about five microns or greater.

FIG. 3 shows a top view of an optic after grinding as in FIG. 2. The width "w" of the annulus of the scratched area 28, where material is removed from the optic 19, is preferably selected to leave a raised area 26 of unscratched, highly reflective material having a diameter "D" equal to approximately 60% of the waveguide bore width "b". To remove the annulus of material, a size of grit powder 27 of a few tenths of one micron to one micron is employed, which results in scratches of a size which, as a group decrease reflectivity, but do not individually impact performance of the relatively long wavelength $CO_2$ laser.

An alternative optic 34 according to the invention is illustrated in FIG. 4. This optic 34 has had the entire surface 36 outside a circular unscratched area 26 ground by a suitable grinding tool. It also appears feasible to construct an embodiment as shown in FIG. 5 wherein an annular ground area 40 on a circular optic 38 lies within the bore of the square waveguide 11, approximately tangential to the midpoint of each side of the square waveguide 11. The diameter of the optic 38 relative to the size of the bore may also be varied. FIGS. 4 and 5 illustrate that the invention may be practiced in various ways, aside from that shown in FIG. 3.

FIG. 6 illustrates a typical reflectivity "R" vs. radius "r" curve for the resulting optic 19 created according to the method of the preferred embodiment, where $r_1 = \frac{1}{2}$ of the diameter "D" shown in FIG. 3. The curve illustrates substantially a step-down in reflectivity at approximately 60% of the waveguide bore width "b". The step-down may be, for example, from 100% to 75% reflectivity.

In an illustrative application, the preferred embodiment was applied to a prior art waveguide laser employing a 2 millimeter square waveguide and standard optics. Prior to implementation of the preferred embodiment, the laser produced predominantly $EH_{12}$ output under steady state operation. However, with one tapered optic 19 as shown in FIG. 3, the laser produced only the $EH_{11}$ mode under both steady state and transient conditions over a wide range of operating temperatures. Similar results have been obtained with other lasers. The invention thus provides a simple, quick method for modifying low cost, off-the-shelf optics for use on any $CO_2$ waveguide or similar laser with poor mode control.

Another advantage of the invention is that a relatively simple tooling fixture can be used to offset the center of the circular, highly reflective region 26 from the center of the optic 19, as shown in FIG. 7. An optic 19 having highly reflective material whose axis 33 is offset from the axis 31 of the optical element 19 results. In such case, the diameter "D" is defined about the offset axis 33 of the highly reflective region 26 and again is preferably equal to about 60% of the waveguide bore width "b". The offsetting capability provided by the preferred embodiment permits centering of the highly reflective area 26 to the laser bore in lasers where the optical mounts result in offsetting of the center 31 of the optical element 19 from the center 29 of the laser bore, as shown in FIG. 8. Experiments indicate that for a typical waveguide laser, the center of the reflective region 26 should be centered to well within 10% of the bore diameter.

The required reflectivity profile of FIG. 6 can also be obtained by depositing a metal coating over the central area of a partially reflecting optic. For example, an optic having a reflectivity approaching 100% over its central region with a drop off to 75% at 0.060 inch in diameter may be approximated by depositing a thin layer of high reflectivity material such as gold through an approximately 0.060 inch diameter aperture onto a 75% reflective optic. Similarly, one can achieve approximately the same reflectivity profile by depositing an absorptive or reflectivity de-Qing layer on the outer part of a 100% reflective dielectric optic. The appropriate de-Qing material can be selected from standard handbooks, as known in the art. Both approaches are implemented with simple tooling by coating off-the-shelf optics.

As may be appreciated, the just described preferred method for varying reflectivity of an optical element is subject to adaptations and modifications which will be readily apparent to those skilled in the art from the subject disclosure. Therefore, it is to be understood that, within the scope of the appended claims, the invention may be practiced other than as specifically described herein.

What is claimed is:

1. A method of forming an optical element comprising the steps of:
    providing an optical element having a surface of substantially uniform reflectivity; and
    imparting a step function approximation of a taper to said reflectivity.

2. The method of claim 1, wherein said optical element is adapted for use with a waveguide laser having a selected bore width and wherein said step approximation occurs at a distance from the center of said optical element equal to approximately 60% of one-half of the waveguide bore width.

3. The method of claim 1, wherein said step approximation is imparted by removing an annular portion of said surface.

4. The method of claim 3 wherein the removal of said annular portion is achieved by applying a rotatable grinding tool having an annular grinding surface thereon to said surface and rotating said tool to grind off said annular portion of said surface.

5. The method of claim 1, wherein said step approximation is imparted by removing a portion of said surface to leave a circular portion of said surface remaining.

6. The method of claim 5, wherein said waveguide has a selected bore width and wherein the diameter of said circular portion is equal to 60% of the waveguide bore width.

7. The method of claim 6 wherein the removal of said portion is achieved by applying a rotatable grinding tool having an annular grinding surface thereon to said surface and rotating said tool to grind off a portion of said surface.

8. The method of claim 5, wherein the depth of material removed is about five microns or greater.

9. The method of claim 1, wherein said step approximation is imparted by removing a portion of said surface area, the portion removed being located to compensate for dimensional offset in the mounting of said optical element.

10. The method of claim 1, wherein said optical element is circular and wherein said step approximation is imparted by removing a portion of said surface such that a circle of surface material offset from the center of said circular optical element results.

11. The method of claim 1, wherein said step approximation is imparted by depositing a layer having a first reflectivity through a circular aperture onto an optic surface having a second reflectivity lower than said first reflectivity.

12. The method of claim 1, wherein said step approximation is imparted by depositing an annular de-Qing layer on a reflective optic.

13. The method of claim 12, wherein said optic has a reflectivity of 100% prior to the deposition of said annular de-Qing layer.

14. A method of forming an optical element for use in a laser mode control comprising the steps of:
providing a grinding tool having a grinding surface thereon;
providing an optical element having a surface area of substantially uniform reflectivity;
applying said grinding surface to said surface area to impart a step function approximation of a taper to the reflectivity thereof by removing a portion of said surface area.

15. The method of claim 14, wherein the portion of said surface area removed is an annular portion.

16. The method of claim 14, wherein said optical element is adapted for use with a waveguide having a selected bore width and wherein removal of said annular portion leaves a circular area of material remaining having a radius equal to substantially 60% of one-half of said bore width.

17. The method of claim 16, wherein the depth of the portion removed is on the order of five microns or greater.

18. The method of claim 14, wherein the location of the portion of said surface area removed is selected to compensate for offset in mounting of said optical element.

19. The method of claim 18, wherein said optical element is circular and wherein removal of said portion leaves a circular area of material having a center offset from the center of the circular optical element.

* * * * *